United States Patent
Kudo

(10) Patent No.: US 7,960,925 B2
(45) Date of Patent: Jun. 14, 2011

(54) ULTRASONIC MOTOR DRIVING METHOD AND ULTRASONIC MOTOR

(75) Inventor: Koichi Kudo, Akiruno (JP)

(73) Assignee: Olympus Corporation, Tokyo (JP)

( * ) Notice: Subject to any disclaimer, the term of this patent is extended or adjusted under 35 U.S.C. 154(b) by 497 days.

(21) Appl. No.: 12/188,768

(22) Filed: Aug. 8, 2008

(65) Prior Publication Data

US 2009/0039806 A1    Feb. 12, 2009

(30) Foreign Application Priority Data

Aug. 10, 2007  (JP) .................................. 2007-210189

(51) Int. Cl.
*H02P 1/00*       (2006.01)
(52) U.S. Cl. .................................. 318/119; 310/316.01
(58) Field of Classification Search .................. 318/119, 318/126, 127; 310/316.01, 316.02, 311, 310/319
See application file for complete search history.

(56) References Cited

U.S. PATENT DOCUMENTS

| 5,656,881 A * | 8/1997 | Atsuta ...................... 310/316.01 |
| 7,109,639 B2 * | 9/2006 | Yamamoto et al. ...... 310/323.16 |
| 7,317,291 B2 * | 1/2008 | Atsuta et al. .................. 318/119 |

FOREIGN PATENT DOCUMENTS

JP          10-191658        7/1998

* cited by examiner

*Primary Examiner* — Rina I Duda
(74) *Attorney, Agent, or Firm* — Scully, Scott, Murphy & Presser, P.C.

(57) ABSTRACT

There is provided a method of driving an ultrasonic motor configured so that two alternating voltages having a predetermined difference between respective phases and having predetermined drive frequencies are applied to a laminated piezoelectric body that has driving parts abutting a member to be driven, whereby simultaneous excitation of vertical and bending vibrations and hence excitation of an elliptical vibration occur in the piezoelectric body, and the driving parts receiving drive force from the elliptical vibration drive the driven member. The method includes performing wear particle removal drive at a fixed frequency during regular reciprocal drive so as to intermittently interrupt the regular drive, the regular drive being such that the driving parts repeatedly reciprocally drive the driven member within a predetermined range, and the wear particle removal drive being such that the driving parts reciprocally drive the driven member within a removal drive range wider than the predetermined range.

14 Claims, 3 Drawing Sheets

|  | Repeatable, durable drive frequency |
|---|---|
| Regular reciprocal drive only | 10,000 to 20,000 times |
| Regular reciprocal drive + wear particle removal drive | 70,000 times |

FIG. 4

|  | Repeatable, durable drive frequency |
|---|---|
| Regular reciprocal drive + wear particle removal drive | 70,000 times |
| Regular reciprocal drive + wear particle removal drive + speed increase | 150,000 times |

FIG. 5

ULTRASONIC MOTOR DRIVING METHOD AND ULTRASONIC MOTOR

CROSS-REFERENCE TO RELATED APPLICATIONS

This application is based upon and claims the benefit of priority from prior Japanese Patent Application No. 2007-210189, filed Aug. 10, 2007, the entire contents of which are incorporated herein by reference.

BACKGROUND OF THE INVENTION

1. Field of the Invention

The present invention relates to ultrasonic motor driving methods and ultrasonic motors.

2. Description of the Related Art

Recently, the use of ultrasonic motors of more compact size, higher torque, longer stroke, and higher resolution than electromagnetic motors has greatly increased.

Such ultrasonic motors are designed such that an ultrasonic vibrator is pressed, via a driving part serving as a frictional member, against a driven member serving as a member moved relative to the vibrator. This produces frictional force between the driving part and the driven member, thereby driving this member.

The technique of driving an ultrasonic motor efficiently and stably for a long time is disclosed in, for example, Jpn. Pat. Appln. KOKAI Publication No. 10-191658.

This publication discloses a vibrating actuator that includes: a vibrator; and a driven member disposed in pressurized contact with the vibrator and moved relative to the vibrator. The vibrating actuator has an adhered material removal area defined in a predetermined part of either one of the contact faces between the vibrator and driven member or predetermined parts of both of the contact faces, to remove material adhered to the contact faces.

The technique disclosed in Jpn. Pat. Appln. KOKAI Publication No. 10-191658 makes the surface roughness of the adhered material removal area greater than that of the other drive areas, thereby removing wear particles clinging to the contact faces at the adhered material removal area.

However, in the vibrating actuator in Jpn. Pat. Appln. KOKAI Publication No. 10-191658, the area including the adhered material removal area is a fixed drive range of a driving part (i.e., a driving force output portion of the vibrating actuator in the publication) in a regular drive period.

Accordingly, even after wear particles clinging to the driving part are removed at the adhered material removal area, the wear particles may be pulled into another drive range, that is, the regular reciprocal drive range.

The technique disclosed in Jpn. Pat. Appln. KOKAI Publication No. 10-191658 has not yet completely overcome the foregoing problem that wear particles are caught between the driving part and the driven member, with the result that the speed of the driven member drops and as the driving part moves over the wear particles it ends up stopping the driven member.

BRIEF SUMMARY OF THE INVENTION

The present invention has been proposed in view of the drawbacks described above. It is accordingly an object of the present invention to provide an ultrasonic driving method and an ultrasonic motor in which degradation of drive characteristics caused by the wear particles produced, e.g., over a long drive period is significantly reduced.

In order to achieve the above-described object, a first aspect of the present invention provides a method of driving an ultrasonic motor configured so that two alternating voltages having a predetermined difference between respective phases and having predetermined drive frequencies are applied to a piezoelectric element that has driving parts abutting a member to be driven, whereby simultaneous excitation of vertical and bending vibrations and hence excitation of an elliptical vibration occur in the piezoelectric element, and the driving parts receiving drive force from the elliptical vibration drive the member to be driven, the method comprising: performing wear particle removal drive at a fixed frequency during regular reciprocal drive so as to intermittently interrupt the regular reciprocal drive, the regular reciprocal drive being such that the driving parts repeatedly reciprocally drive the driven member within a predetermined drive range, and the wear particle removal drive being such that the driving parts reciprocally drive the driven member within a drive range wider than the predetermined range.

In order to achieve the above-described object, a second aspect of the present invention provides an ultrasonic motor configured so that two alternating voltages having a predetermined difference between respective phases and having predetermined drive frequencies are applied to a piezoelectric element that has driving parts abutting a member to be driven, whereby simultaneous excitation of vertical and bending vibrations and hence excitation of an elliptical vibration occur in the piezoelectric element, and the driving parts receiving drive force from the elliptical vibration drive the member to be driven, the ultrasonic motor comprising: a control circuit which controls switching between a regular reciprocal drive mode in which the driving parts repeatedly reciprocally drive the driven member within a predetermined drive range and a wear particle removal drive mode in which the driving parts reciprocally drive the driven member within a drive range wider than the predetermined range, wherein the control circuit switches to the wear particle removal drive mode at a fixed frequency during drive in the regular reciprocal drive mode.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a table illustrating the effects of the ultrasonic motor driving method and ultrasonic motor according to the first embodiment of the present invention; and FIG. 5 is a table illustrating the effects of the ultrasonic motor driving method and ultrasonic motor according to the second embodiment of the present invention.

DETAILED DESCRIPTION OF THE INVENTION

Referring to the accompanying drawings there will be described an ultrasonic motor driving method and ultrasonic motor according to the embodiments of the present invention.

First Embodiment

Figure 1A:
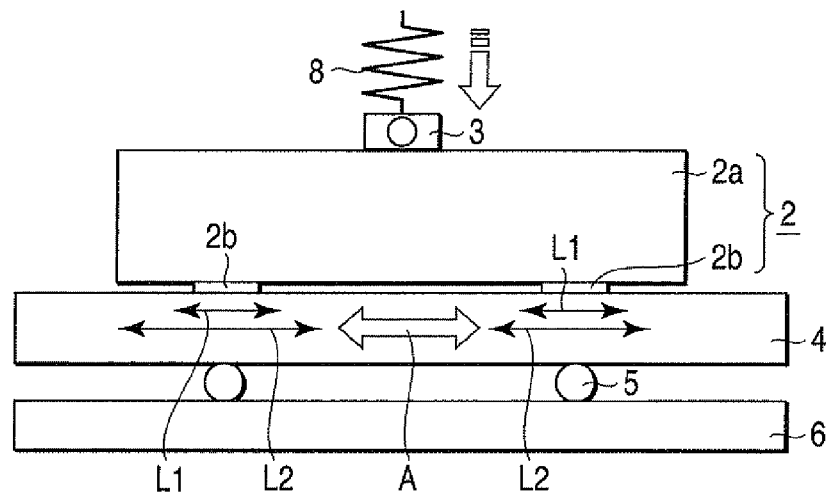
FIG. 1A is a schematic sectional view of the configuration of an ultrasonic motor according to the first embodiment of the present invention.

FIG. 1A is a schematic sectional view of the configuration of an ultrasonic motor according to the first embodiment of the present invention. As shown in FIG. 1A, the ultrasonic motor 1 according to the first embodiment includes: an ultrasonic vibrator 2; a holding member 3 holding the ultrasonic vibrator 2; a member 4 (hereinafter referred to as a "driven member 4"), which is driven relative to and in contact with the ultrasonic vibrator 2; rotating members 5 disposed between the driven member 4 and a housing 6; and a pressing member 8 which presses the ultrasonic vibrator 2 against the driven member 4.

The ultrasonic vibrator 2 has: a rectangular parallelepipedic laminated piezoelectric body 2a formed from layered rectangular piezoelectric ceramic sheets, each ceramic sheet having a sheet-like internal electrode on its one side; and two frictional contacts (hereinafter referred to as "driving parts") 2b affixed to one side of the laminated piezoelectric body 2a and disposed in close contact with the driven member 4.

Figure 2:
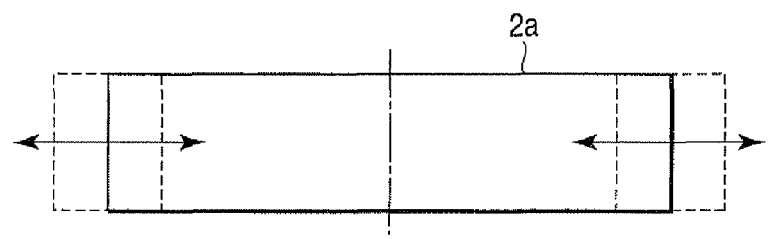
FIG. 2 is a view showing vertical vibration of the laminated piezoelectric body.
Figure 3:
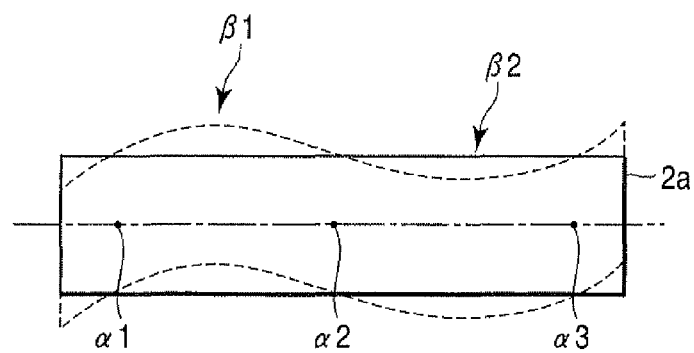
FIG. 3 is a view showing bending vibration of the laminated piezoelectric body.

In the laminated piezoelectric body 2a, an alternating voltage of predetermined pattern is applied to the internal electrodes, thereby exciting vertical vibration as shown in FIG. 2 and secondary bending vibration as shown in FIG. 3. To be more specific, two external electrodes (not shown) formed at one end of the laminated piezoelectric body 2a in its lengthwise direction are assumed to be phase A (A+, A−), and two external electrodes (not shown) at the other end, phase B (B+, B−). By applying to phase A and phase B alternating voltages having the same phase and respective frequencies corresponding to the resonance frequency, a primary vertical vibration is excited in the laminated piezoelectric body 2a, as shown in FIG. 2. By applying to phase A and phase B alternating voltages having a phase opposite to each other and respective frequencies corresponding to the resonance frequency, a secondary bending vibration as shown in FIG. 3 is excited in the laminated piezoelectric body 2a.

The secondary bending vibration has nodes $\alpha 1$, $\alpha 2$, and $\alpha 3$ of a vibration standing wave, which are interspatially present in the lengthwise direction of the laminated piezoelectric body 2a, as shown in FIG. 3. Formed between the nodes $\alpha 1$ and $\alpha 2$ is the antinode $\beta 1$ of the vibration standing wave, and formed between the nodes $\alpha 2$ and $\alpha 3$ is an antinode $\beta 2$ of the vibration standing wave.

At the place corresponding to the node $\alpha 2$ of the standing wave of the vertical vibration and bending vibration, the laminated piezoelectric body 2a is fixed to the holding member 3 by means of an adhesive or the like. The driving parts 2b have the form of a parallelepiped block and are fixed at places corresponding to the antinodes $\beta 1$ and $\beta 2$ of the secondary bending vibration of the ultrasonic vibrator 2 by means of an adhesive or the like.

The rotating members 5 have a spherical shape and are held between the driven member 4 and the housing 6 such that the rotating members 5 fit in a groove or the like formed on a surface of the driven member 4 opposite the housing 6. In this case, the position of the driven member 4 in the direction of movement is regulated by, e.g., a retainer (not shown). Such a configuration enables the driven member 4 to be driven (i.e., to be alternately moved backward and forward in the directions shown by arrow A in FIG. 1A) relative to the ultrasonic vibrator 2 and housing 6.

As a matter of course, the housing 6 may have a member (e.g., a groove or rail) which guides the rotating members 5. The pressing member 8 is a spring member as shown in FIG. 1, and is fixed to the housing of the ultrasonic motor by means of screws or the like. The pressing member 8 is not limited to the spring member as shown in FIG. 1, but may be any member capable of pressing the ultrasonic vibrator 2 against the driven member 4.

Referring to FIGS. 1A to 1D, next will be described a drive range of the driving part 2b in the ultrasonic motor driving method and ultrasonic motor according to the first embodiment.

Figure 1B:
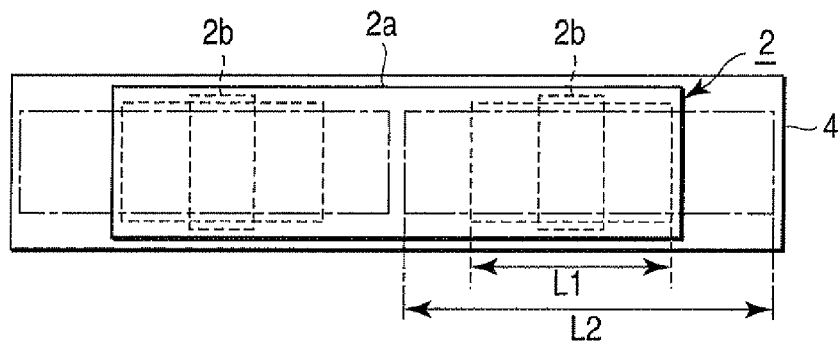
FIG. 1B is a top view of the ultrasonic motor according to the first embodiment of the present invention.

FIG. 1B is a top view of the ultrasonic motor according to the first embodiment of the present invention (for sake of simplicity, showing only the ultrasonic vibrator 2 and the driven member 4), and is a diagram representing the drive range of the driving part 2b.

Figure 1C:
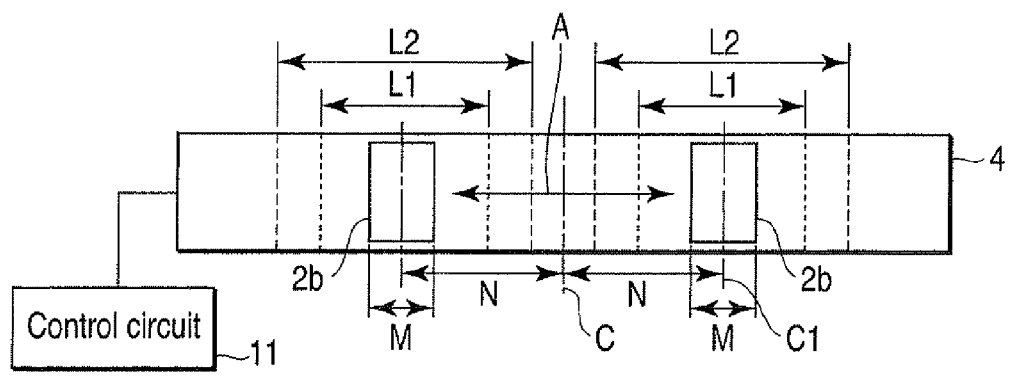
FIG. 1C is a view illustrating the drive concept, showing a control circuit that controls the drive of the ultrasonic motor by applying an alternating voltage of predetermined pattern to the internal electrodes of the laminated piezoelectric body, as well as showing various values relating to conditions the drive range of each of the driving parts must satisfy.

FIG. 1C is a view illustrating the drive concept, showing a control circuit 11 that controls the drive of the ultrasonic motor by applying an alternating voltage of predetermined pattern to the internal electrodes (not shown) of the laminated piezoelectric body 2a, as well as showing various values relating to conditions the drive range of each of the driving parts must satisfy.

The ultrasonic motor according to the first embodiment has a regular drive mode, in which regular drive is performed, and a wear particle removal mode, in which a drive is performed to remove wear particles produced in parts involved in frictional drive (i.e., the contact parts between the driving parts 2b and the driven member 4). Switching between the regular drive mode and wear particle removal mode is controlled by the control circuit 11.

Symbols L1, L2, M and N have the following meanings:

L1 is a drive range (hereinafter referred to as "a regular reciprocal drive range") for each of the driving parts 2b in the regular drive mode;

L2 is a drive range (hereinafter referred to as "a wear particle removal drive range") of the driving part 2b in the wear particle removal mode;

M is the width of the driving part 2b in the driving directions; and

N is a distance from the center c of the driven member 4 in the driving directions (i.e., in the directions indicated by the arrow A, hereinafter the same) to the center c1 of the driving part 2b in the driving directions (i.e., in the directions indicated by the arrow A, hereinafter the same).

The regular reciprocal drive range L1 and wear particle removal drive range L2 of the driving part 2b satisfy the formulae below.

$$L2 > L1$$

$$N > L2/2$$

N>M

L2>M

The ratio of the number of times that the driving part 2*b* drives in the regular drive mode (hereinafter referred to as "the frequency of regular drives") to the number of times that the driving part drives in the wear particle removal mode (hereinafter referred to as "the frequency of wear particle removal drives") is, for example, the frequency of regular drives: the frequency of wear particle removal drives=10:3. The ratio of the frequency of the wear particle removal drives may be higher than this ratio.

As is described above, the first embodiment provides an ultrasonic motor driving method and ultrasonic motor in which degradation of drive characteristics caused by wear particles produced, e.g., during a long drive period is significantly reduced.

According to the ultrasonic motor driving method and ultrasonic motor according to the first embodiment, drive in the wear particle removal mode is performed at a fixed frequency during drive in the regular drive mode so as to intermittently interrupt this drive.

By driving each of the driving parts 2*b* within the wear particle removal drive range L2 wider than the regular reciprocal drive range L1 at the fixed frequency, wear particles resulting from regular drive are moved to places where the wear particles will not adversely affect the drive characteristics.

Accordingly, wear particles accumulating at the return points of the drive during the regular reciprocal drive are moved to the outside of the regular reciprocal drive range, which greatly decreases wear particles caught by the driving parts 2*b* during the regular drive mode. This makes the characteristics of the ultrasonic motor less likely to deteriorate from the initial characteristics, prevents the ultrasonic motor from stopping within a short time after starting, and thus improves the durability of the ultrasonic motor.

To be more specific, as shown in FIG. 4, "repeatable, durable drive frequency" (i.e., the number of times that the supersonic motor is driven until a driving speed decreases or driving stops due to wear particles) is approximately 10,000 to 20,000 times where only the regular reciprocal drive is performed as in a conventional ultrasonic motor driving method or ultrasonic motor. However, where the wear particle removal drive described above is performed in addition to the regular reciprocal drive as in the ultrasonic motor driving method and ultrasonic motor according to the first embodiment, the "repeatable, durable drive frequency" is approximately 70,000 times.

The ultrasonic motor driving method and ultrasonic motor according to the first embodiment is approximately 3.5 times to 7 times as high as conventional ones in terms of repeatable, durable drive frequency.

Figure 1D:
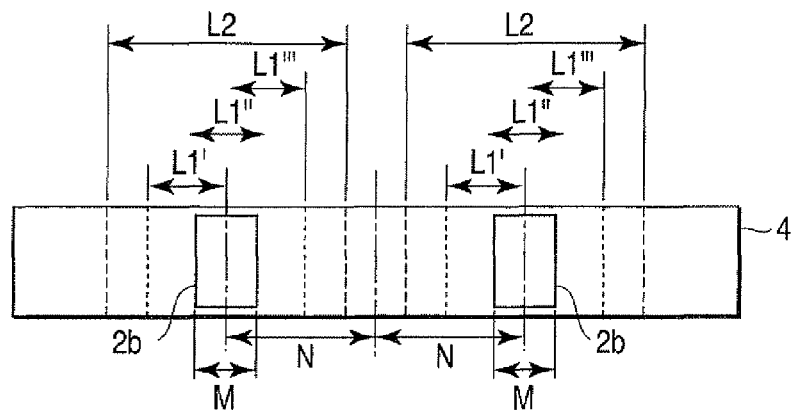
FIG. 1D is a view showing an example of a regular reciprocal drive range L1.

Any value for the regular reciprocal drive range L1 suffices as long as the relation expressed by L2>L1 is satisfied. As a matter of course, as with the ranges L1', L1", and L1"', as shown in FIG. 1D, the range L1 may be narrower than the L1 shown in FIGS. 1A to 1C.

Incidentally, in the ultrasonic motor driving method and ultrasonic motor according to the first embodiment, the entire surface roughness of the driven member 4 may be uniform. This will prevent additional manufacturing cost increase resulting from the alteration of the surface roughness of part of a driven member as in the technique disclosed in, e.g., Jpn. Pat. Appln. KOKAI Publication No. 10-191658.

Second Embodiment

Next will be described an ultrasonic motor driving method and ultrasonic motor according to the second embodiment of the present invention. In order to focus on the features of the ultrasonic motor driving method and ultrasonic motor according to the second embodiment, a description is given only of features that differ from those in the first embodiment.

In the ultrasonic motor driving method and ultrasonic motor according to the second embodiment, the driving speed assigned in the wear particle removal mode is higher than that in the regular drive mode. Specifically, the driving speed in the wear particle removal mode is approximately 80 mm/s whereas the driving speed in the regular drive mode is approximately 40 mm/s.

Thus, in the wear particle removal mode, the driven member 4 is driven at the higher driving speed (i.e., with greater energy) than in the regular drive mode. This removes wear particles adhering to the contact faces between the driving member 4 and the driving parts 2*b*. In addition, even if the driving parts 2*b* are moved over the wear particles, the higher driving speed makes it possible for the driving parts 2*b* to move over the wear particles without stopping the drive.

Three specific examples of methods for increasing driving speed when switching to wear particle removal mode are given below.

(Method 1) The frequencies of the alternating voltages to be applied to phases A and B of the external electrodes formed on the laminated piezoelectric body 2*a* mentioned above are brought to approach more closely the corresponding resonance frequencies.

(Method 2) The phase difference between the alternating voltages applied to phases A and B of the external electrodes formed on the laminated piezoelectric body 2*a* approaches more closely 90°.

(Method 3) The alternating voltages applied to phases A and B of the external electrodes formed on the laminated piezoelectric body 2*a* are further increased.

As is described above, the second embodiment provides an ultrasonic motor driving method and ultrasonic motor in which degradation of drive characteristics caused by wear particles produced, e.g., during a long drive period is significantly decreased.

To be more specific, as shown in FIG. 5, "repeatable, durable drive frequency" where the same driving speed is assigned in the regular drive mode and in the wear particle removal mode, as in the ultrasonic motor driving method and ultrasonic motor according to the first embodiment, is approximately 70,000 times. Compared to this, where the driving speed in the wear particle removal mode is higher than in the regular drive mode, as in the ultrasonic motor according to the second embodiment, "repeatable, durable drive frequency" is approximately 150,000 times.

In other words, "repeatable, durable drive frequency" in the ultrasonic motor driving method and ultrasonic motor according to the second embodiment is approximately twice as high as that in the first embodiment.

Having described the invention in terms of the first and second embodiments, the invention is not limited to any of the above-described embodiments and that various changes and modifications may be made in the invention without departing from the spirit and scope thereof.

For example, in the ultrasonic motor driving method and ultrasonic motor according to the first and second embodiments, the reciprocal drive path of the driving member 4 is assumed to be linear for the sake of simplicity. However, a reciprocal drive having other forms of path may be employed.

Further, the foregoing embodiments include various steps of the invention and it is understood that various inventions may be realized by suitable combinations of the features disclosed above. For example, where any problem described above can be solved and where any advantageous effect described above can be yielded even if some of the features in the embodiments described above are omitted, a configuration from which such features are removed may also be realized as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of driving an ultrasonic motor configured so that two alternating voltages having a predetermined difference between respective phases and having predetermined drive frequencies are applied to a piezoelectric element that has driving parts abutting a member to be driven, whereby simultaneous excitation of vertical and bending vibrations and hence excitation of an elliptical vibration occur in the piezoelectric element, and the driving parts receiving drive force from the elliptical vibration drive the member to be driven, the method comprising:

performing wear particle removal drive at a fixed frequency during regular reciprocal drive so as to intermittently interrupt the regular reciprocal drive, the regular reciprocal drive being such that the driving parts repeatedly reciprocally drive the driven member within a predetermined drive range, and the wear particle removal drive being such that the driving parts reciprocally drive the driven member within a drive range wider than the predetermined drive range.

2. The method according to claim 1, wherein the reciprocal drive is linear.

3. The method according to claim 1, wherein if a drive range for each of the driving parts during the regular reciprocal drive is L1, a drive range for each of the driving parts during the wear particle removal drive is L2, the width of the driving part in the driving directions is M, and a distance from the center of the driven member to the center of the driving part in the driving directions is N, then L1, L2, M, and N satisfy the following formulae:

$L2>L1$, $N>L2/2$, $N>M$, and $L2>M$.

4. The method according to claim 1, wherein the driving speed for the wear particle removal drive is made higher than that for the regular reciprocal drive.

5. The method according to claim 4, wherein the driving speed for the wear particle removal drive is made higher than that for the regular reciprocal drive by making the respective frequencies of the two alternating voltages closer to the corresponding resonance frequencies.

6. The method according to claim 4, wherein the driving speed for the wear particle removal drive is made higher than that for the regular reciprocal drive by making the phase difference between the two alternating voltages closer to 90°.

7. The method according to claim 4, wherein the driving speed for the wear particle removal drive is made higher than that for the regular reciprocal drive by making the two alternating voltages higher.

8. An ultrasonic motor configured so that two alternating voltages having a predetermined difference between respective phases and having predetermined drive frequencies are applied to a piezoelectric element that has driving parts abutting a member to be driven, whereby simultaneous excitation of vertical and bending vibrations and hence excitation of an elliptical vibration occur in the piezoelectric element, and the driving parts receiving drive force from the elliptical vibration drive the member to be driven, the ultrasonic motor comprising:

a control circuit which controls switching between a regular reciprocal drive mode in which the driving parts repeatedly reciprocally drive the driven member within a predetermined drive range and a wear particle removal drive mode in which the driving parts reciprocally drive the driven member within a drive range wider than the predetermined drive range, wherein the control circuit switches to the wear particle removal drive mode at a fixed frequency during drive in the regular reciprocal drive mode.

9. The ultrasonic motor according to claim 8, wherein the reciprocal drive is linear.

10. The ultrasonic motor according to claim 8, wherein if a drive range for each of the driving parts during the regular reciprocal drive is L1, a drive range for each of the driving parts during the wear particle removal drive is L2, the width of the driving part in the driving directions is M, and a distance from the center of the driven member to the center of the driving part in the driving directions is N, then L1, L2, M, and N satisfy the following formulae:

$L2>L1$, $N>L2/2$, $N>M$, and $L2>M$.

11. The ultrasonic motor according to claim 8, wherein the control circuit makes the driving speed for the wear particle removal drive higher than that for the regular reciprocal drive.

12. The ultrasonic motor according to claim 11, wherein the control circuit makes the driving speed for the wear particle removal drive higher than that for the regular reciprocal drive by making the respective frequencies of the two alternating voltages closer to the corresponding resonance frequencies.

13. The ultrasonic motor according to claim 11, wherein the control circuit makes the driving speed for the wear particle removal drive higher than that for the regular reciprocal drive by making the phase difference between the two alternating voltages closer to 90°.

14. The ultrasonic motor according to claim 11, wherein the control circuit makes the driving speed for the wear particle removal drive higher than that for the regular reciprocal drive by making the two alternating voltages higher.

* * * * *